United States Patent
Zhao et al.

(10) Patent No.: US 11,167,759 B2
(45) Date of Patent: Nov. 9, 2021

(54) METHOD AND APPARATUS FOR CONTROLLING A VEHICLE INCLUDING AN ADAPTIVE CRUISE CONTROL SYSTEM

(71) Applicant: GM Global Technology Operations LLC, Detroit, MI (US)

(72) Inventors: Junfeng Zhao, Troy, MI (US); Yiran Hu, Shelby Township, MI (US); Dongxu Li, Troy, MI (US); Steven E. Muldoon, Royal Oak, MI (US); Chen-Fang Chang, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 322 days.

(21) Appl. No.: 16/380,275

(22) Filed: Apr. 10, 2019

(65) Prior Publication Data

US 2020/0324766 A1 Oct. 15, 2020

(51) Int. Cl.
*B60W 30/16* (2020.01)
*B60W 10/04* (2006.01)
*B60W 10/18* (2012.01)

(52) U.S. Cl.
CPC ............ *B60W 30/16* (2013.01); *B60W 10/04* (2013.01); *B60W 10/18* (2013.01); *B60W 2552/15* (2020.02); *B60W 2554/801* (2020.02); *B60W 2554/804* (2020.02); *B60W 2556/50* (2020.02); *B60W 2556/65* (2020.02); *B60W 2720/10* (2013.01); *B60W 2754/30* (2020.02)

(58) Field of Classification Search
CPC .. B60W 10/04; B60W 10/18; B60W 2552/15; B60W 2554/4042; B60W 2554/408; B60W 2554/801; B60W 2554/804; B60W 2556/50; B60W 2556/65; B60W 2720/10; B60W 2754/30; B60W 30/16; B60W 50/0097

See application file for complete search history.

(56) References Cited

U.S. PATENT DOCUMENTS 6,233,515 B1 * 5/2001 Engelman ............ G05B 13/042
701/96
6,560,525 B1 * 5/2003 Joyce .................... B60W 30/16
701/96

(Continued)

*Primary Examiner* — Babar Sarwar
(74) *Attorney, Agent, or Firm* — Quinn IP Law

(57) ABSTRACT

Operating a subject vehicle equipped with an adaptive cruise control system includes setting initial states for control parameters, including setting a desired vehicle speed and determining a desired following gap range, wherein the desired following gap range is associated with a lead vehicle. Operation is controlled via the adaptive cruise control system based upon the initial states for the control parameters. Operation also includes monitoring for presence of the lead vehicle. Upon detecting presence of the lead vehicle, an actual following gap is determined between the subject vehicle and the lead vehicle, and the initial states of the control parameters associated with the adaptive cruise control system are adjusted based upon the actual following gap between the subject vehicle and the lead vehicle, and the desired following gap range. Operation is controlled via the adaptive cruise control system based upon the adjusted initial states of the control parameters.

19 Claims, 4 Drawing Sheets

(56) References Cited

U.S. PATENT DOCUMENTS

| | | | |
|---|---|---|---|
| 8,977,464 B1* | 3/2015 | Takahashi | B60W 30/045 |
| | | | 701/70 |
| 10,766,496 B2* | 9/2020 | Schacher | G06N 3/08 |
| 10,780,884 B2* | 9/2020 | Masui | G05D 1/0246 |
| 2003/0204298 A1* | 10/2003 | Ahmed-Zaid | B60K 31/0008 |
| | | | 701/96 |
| 2003/0204299 A1* | 10/2003 | Waldis | B60K 31/0058 |
| | | | 701/96 |
| 2004/0068359 A1* | 4/2004 | Neiss | B60W 50/0097 |
| | | | 701/96 |
| 2004/0078133 A1* | 4/2004 | Miller | B60K 31/0008 |
| | | | 701/96 |
| 2013/0131947 A1* | 5/2013 | Takahashi | B60T 7/042 |
| | | | 701/70 |
| 2013/0166100 A1* | 6/2013 | Gordh | B60W 30/182 |
| | | | 701/1 |
| 2014/0114548 A1* | 4/2014 | Kagerer | B60W 30/16 |
| | | | 701/96 |
| 2015/0073662 A1* | 3/2015 | Schmudderich | B60W 30/16 |
| | | | 701/41 |
| 2018/0148068 A1* | 5/2018 | Dai | B60W 10/184 |
| 2019/0168758 A1* | 6/2019 | Matsumoto | G01S 13/867 |
| 2020/0148213 A1* | 5/2020 | Gawande | G06K 9/00791 |

* cited by examiner

METHOD AND APPARATUS FOR CONTROLLING A VEHICLE INCLUDING AN ADAPTIVE CRUISE CONTROL SYSTEM

STATEMENT REGARDING FEDERALLY-SPONSORED RESEARCH OR DEVELOPMENT

This invention was made with Government support under Award No. DE-AR0000790, awarded by ARPA-E, U.S. Department of Energy. The United States Government has certain rights in this invention.

INTRODUCTION

Operational control of a vehicle includes control of various on-vehicle systems in response to operator commands and/or autonomous controls. Operator commands and autonomous control systems may generate commands for acceleration, braking, and steering. On-vehicle systems that may be subject to operator commands and autonomous controls may include a prime mover in the form of an internal combustion engine and/or an electric machine, a wheel braking system, and a steering system.

Cruise control is an on-vehicle system that controls operation of a prime mover in response to an operator command to operate a vehicle at a set vehicle speed. Adaptive cruise control is a refinement of a cruise control system that incorporates extra-vehicle monitoring systems to monitor sensed objects that are in a trajectory of the vehicle, e.g., monitoring speeds of proximal vehicles that are in a lane of travel of the vehicle. An adaptive cruise control system is a form of a longitudinal motion control system.

One form of an adaptive cruise control system operates by controlling a vehicle at a set vehicle speed while taking into account speed of one or more lead vehicle(s), in order to maintain a desired gap between the lead vehicle and the subject vehicle. In one embodiment, an adaptive cruise control system operates by controlling vehicle speed to track the speed of a lead vehicle by controlling operation of a prime mover to control vehicle acceleration, or activation of a braking system to control vehicle deceleration and to maintain vehicle operation at the desired gap from the lead vehicle(s). In one embodiment, the lead vehicle may be detected through a sensing system including a sensor that may be mounted on the front of the subject vehicle. The sensing system may include RADAR, LIDAR, combinations thereof, or another system. The subject vehicle maintains the desired distance by controlling the propulsion system and/or the braking system.

Known adaptive cruise control systems (ACC) may operate by reacting to movement and changes in operation of a lead vehicle. This may include strictly maintaining a desired vehicle speed and/or a desired gap, i.e., a desired following distance, based upon operation of the lead vehicle, which may tend to cause unnecessary acceleration or deceleration events. Such unnecessary acceleration or deceleration events may evoke operator discomfort. Such unnecessary acceleration or deceleration events may also unnecessarily consume fuel and/or electric power, thus reducing fuel economy, reducing a vehicle driving range, and/or increasing need for charging of an on-board DC power source.

SUMMARY

A subject vehicle equipped with an adaptive cruise control system is described. Operating the subject vehicle includes setting initial states for control parameters associated with the adaptive cruise control system, including setting a desired vehicle speed and determining a desired following gap range, wherein the desired following gap range is associated with a lead vehicle. Operation of the subject vehicle is controlled via the adaptive cruise control system based upon the initial states for the control parameters. Operation also includes monitoring for presence of the lead vehicle. Upon detecting the presence of the lead vehicle, an actual following gap is determined between the subject vehicle and the lead vehicle, and the initial states of the control parameters associated with the adaptive cruise control system are adjusted based upon the actual following gap between the subject vehicle and the lead vehicle, and the desired following gap range. Operation of the subject vehicle is controlled via the adaptive cruise control system based upon the adjusted initial states of the control parameters.

An aspect of the disclosure includes the subject vehicle including a propulsion system and a braking system that are operably connected to the adaptive cruise control system, and wherein controlling, via the adaptive cruise control system, operation of the subject vehicle based upon the adjusted initial states of the control parameters includes controlling, via the adaptive cruise control system, operation of the propulsion system and the braking system based upon the adjusted initial states of the control parameters.

Another aspect of the disclosure includes determining the desired following gap range, which includes determining a minimum permissible following gap and a maximum permissible following gap relative to the lead vehicle. This includes controlling, via the adaptive cruise control system, operation of the subject vehicle such that the actual following gap between the subject vehicle and the lead vehicle is greater than the minimum permissible following gap and is less than the maximum permissible following gap.

Another aspect of the disclosure includes the subject vehicle including a spatial monitoring system, wherein monitoring for the presence of the lead vehicle includes monitoring, via the spatial monitoring system, for the presence of the lead vehicle.

Another aspect of the disclosure includes determining, via the spatial monitoring system, the actual following gap between the subject vehicle and the lead vehicle.

Another aspect of the disclosure includes the vehicle including a telematics device arranged to effect extra-vehicle communication with a second controller, wherein the method further includes assessing, via the extra-vehicle communication with the second controller and the spatial monitoring system, traffic conditions proximal to the subject vehicle; determining, via the vehicle spatial monitoring system, a speed of the lead vehicle; and, determining the desired following gap range based upon the speed of the lead vehicle and the traffic proximal to the subject vehicle.

Another aspect of the disclosure includes the subject vehicle having a GPS sensor and a vehicle navigation system, wherein the method further includes assessing, via the GPS sensor and the vehicle navigation system, impending road conditions; and controlling, via the adaptive cruise control system, operation of the subject vehicle based upon the adjusted initial states of the control parameters and the impending road conditions.

Another aspect of the disclosure includes monitoring speed of the lead vehicle over a period of time; developing a driver model based upon the speed of the lead vehicle over the period of time; predicting operation of the lead vehicle based upon the driver model; adjusting the initial states of the control parameters associated with the adaptive cruise control system based upon the actual following gap between the subject vehicle and the lead vehicle, the desired following gap range and the predicted operation of the lead vehicle based upon the driver model; and, controlling, via the adaptive cruise control system, operation of the subject vehicle based upon the adjusted initial states of the control parameters.

Another aspect of the disclosure includes converting the predicted operation of the lead vehicle into a time-distance domain; and adjusting the desired vehicle speed for the subject vehicle based upon the speed of the lead vehicle and the predicted operation of the lead vehicle in the time-distance domain.

Another aspect of the disclosure includes a desired following gap range being a desired minimum following distance relative to the lead vehicle and a desired maximum following distance relative to the lead vehicle, wherein adjusting the desired vehicle speed for the subject vehicle based upon the speed of the lead vehicle and the predicted operation of the lead vehicle in the time-distance domain includes adjusting the desired vehicle speed for the subject vehicle such that the subject vehicle remains within the following gap range relative to the lead vehicle.

Another aspect of the disclosure includes a method for operating a subject vehicle equipped with an adaptive cruise control system, a GPS sensor and a vehicle navigation system that includes: setting initial states for control parameters associated with the adaptive cruise control system, including setting a desired vehicle speed; controlling, via the adaptive cruise control system, operation of the subject vehicle based upon the initial states for the control parameters; assessing, via the GPS sensor and the vehicle navigation system, impending road conditions; adjusting the initial states of the control parameters associated with the adaptive cruise control system based upon the impending road conditions; and controlling, via the adaptive cruise control system, operation of the subject vehicle based upon the adjusted initial states of the control parameters.

Another aspect of the disclosure includes the subject vehicle including a propulsion system and a braking system that are operably connected to the adaptive cruise control system, and wherein controlling, via the adaptive cruise control system, operation of the subject vehicle based upon the adjusted initial states of the control parameters includes controlling, via the adaptive cruise control system, operations of the propulsion system and the braking system based upon the adjusted initial states of the control parameters.

Another aspect of the disclosure includes assessing the impending road conditions, which includes detecting, via the GPS sensor and the vehicle navigation system, an approaching grade in the road, and adjusting the initial states of the control parameters associated with the adaptive cruise control system based upon the approaching grade in the road.

Another aspect of the disclosure includes detecting an approaching uphill grade associated with a hill, wherein adjusting the initial states of the control parameters associated with the adaptive cruise control system based upon the approaching grade in the road includes initially increasing a desired cruise speed, wherein the increase in the desired cruise speed is less than a desired maximum cruise speed prior to beginning to traverse the uphill grade; decreasing the desired cruise speed during the uphill grade, and resuming operation at a nominal cruise speed upon cresting the hill.

Another aspect of the disclosure includes detecting an approaching downhill grade: wherein adjusting the initial states of the control parameters associated with the adaptive cruise control system based upon the approaching grade in the road includes initially adjusting a state of one of the control parameters associated with the adaptive cruise control system prior to a start of the downhill grade while avoiding reaching a vehicle speed that is less than a desired minimum cruise speed, monitoring vehicle speed, and adjusting a state of one of the control parameters associated with the adaptive cruise control system to avoid exceeding a maximum cruise speed during operation in the downhill grade.

Another aspect of the disclosure includes the control parameters being associated with the adaptive cruise control system including control parameters associated with operations of the propulsion system and the braking system, and wherein initially adjusting the state of one of the control parameters associated with the adaptive cruise control system prior to the start of the downhill grade includes one of decreasing a speed of an internal combustion engine associated with the propulsion system, unlocking a torque converter clutch of a torque converter associated with the propulsion system, or upshifting a transmission gear of a transmission of the propulsion system while avoiding the vehicle speed that is less than the desired minimum cruise speed.

Another aspect of the disclosure includes the control parameters associated with the adaptive cruise control system including control parameters associated with operations of the propulsion system and the braking system, and wherein initially adjusting the state of one of the control parameters associated with the adaptive cruise control system to avoid exceeding a maximum cruise speed during operation in the downhill grade includes controlling the braking system to avoid exceeding the maximum cruise speed during operation in the downhill grade.

As such, the proposed adaptive cruise control system may employ a flexible following gap when following a lead vehicle, and may adjust cruise speed to handle road gradients and to gain energy efficiency.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 5-1 graphically shows a road grade, a nominal cruise speed, and a desired cruise speed in relation to travel distance FIG. 5-2 graphically shows a transmission shift map for an embodiment of a geartrain, including plurality of upshift points and downshift points are indicated in relation to vehicle speed and load, in accordance with the disclosure.

FIG. 5-3 graphically shows an active fuel management (AFM) calibration delineating operation of an engine in an all-cylinder state and an AFM, in accordance with the disclosure.

It should be understood that the appended drawings are not necessarily to scale, and present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

Figure 1:
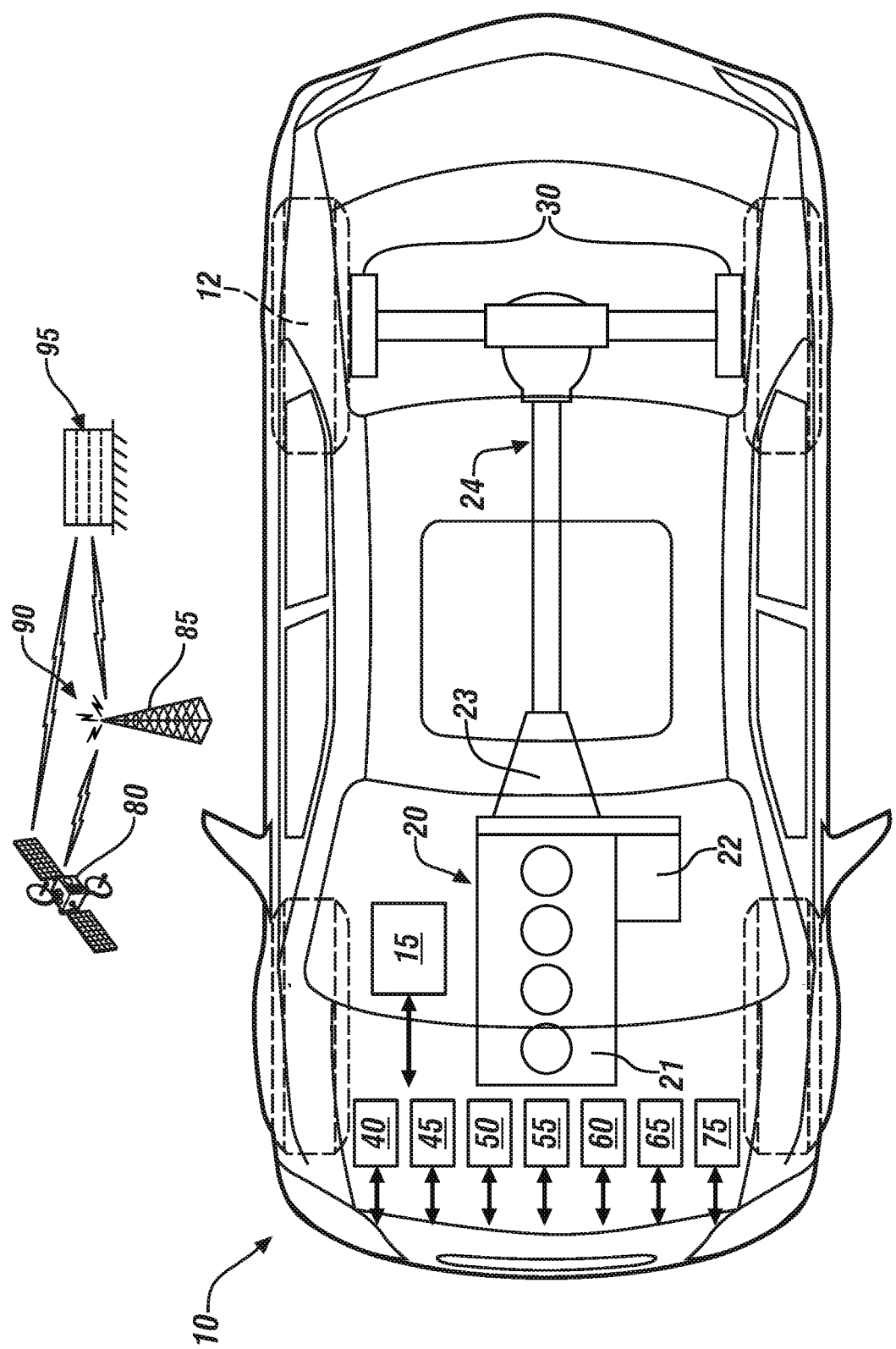
FIG. 1 schematically shows an embodiment of a subject vehicle that is configured with an autonomous operating system including an adaptive cruise control system (ACC), in accordance with the disclosure.

Referring now to the drawings, wherein the showings are for the purpose of illustrating certain exemplary embodiments and not for the purpose of limiting the same, FIG. 1 schematically shows an embodiment of a subject vehicle 10 that is configured with an autonomous operating system 45 that is disposed to provide a level of autonomous vehicle operation. In one embodiment and as described herein, the subject vehicle 10 includes a propulsion system 20, a wheel braking system 30, an adaptive cruise control system (ACC) 40, a Global Position System (GPS) sensor 50, a navigation system 55, a telematics device 60, a spatial monitoring system 65, a human-machine interface (HMI) system 75, and one or more controllers 15. The propulsion system 20 may include, in one embodiment, an internal combustion engine 21, an electric machine 22, a geartrain 23 and a driveline 24 that are arranged to transfer mechanical power to vehicle wheel(s) 12. In one embodiment, and as shown, the propulsion system 20 may be referred to as a P2 hybrid configuration, which describes an arrangement of elements wherein an electric machine is arranged to introduce torque into a drivetrain between an internal combustion engine and a gearbox of a transmission. Operation of elements of the propulsion system 20 may be controlled by one or a plurality of controllers, which monitors signals from one or more sensors and generates commands to one or more actuators to control operation in a manner that is responsive to an operator request for vehicle acceleration and propulsion.

The internal combustion engine 21 may be a multi-cylinder device spark-ignition or compression-ignition device that generates propulsion torque in response to a command from a controller that may be in communication with other on-vehicle controllers. In one embodiment, the internal combustion engine 21 includes an active fuel management (AFM) system, which includes a capability to operate in a cylinder deactivation mode, which includes dynamically deactivating combustion in one or a plurality of the cylinders in order to conserve fuel under certain load conditions. In one embodiment, the internal combustion engine 21 may operate in an engine-off state in response to certain conditions, and may also operate in a deceleration fuel cut-off state in response to other conditions.

The electric machine 22 may be a multi-phase electric machine capable of operating as either an electric motor or an electric power generator, including operating the electric machine 22 to generate propulsion torque and operating the electric machine 22 to react driveline torque in a regenerative braking state associated with an regenerative energy recovery strategy. Operation is controlled by a controller that may be in communication with other on-vehicle controllers.

The geartrain 23 may be a fixed-gear automatic transmission, or another device that is capable of transmitting torque at a fixed speed ratio or a variable speed ratio from either or both the internal combustion engine 21 and the electric machine 22 to the driveline 24. Operation is controlled by a controller that may be in communication with other on-vehicle controllers.

The wheel braking system 30 includes a device capable of applying braking torque to one or more vehicle wheels 12, and an associated controller, which monitors signals from one or more sensors and generates commands to one or more actuators to control operation in a manner that is responsive to an operator request for braking.

The ACC 40 includes a controller that is in communication with the controllers of the wheel braking system 30, the propulsion system 20, and the HMI system 75, and also in communication with the spatial monitoring system 65. The ACC 40 executes control routines that determine an operator request to maintain vehicle speed at a predefined speed level from the HMI system 75, monitors inputs from the spatial monitoring system 65. The ACC 40 commands operation of the propulsion system 20 and the wheel braking system 30 to effect vehicle acceleration, braking, or coasting in response.

The terms controller, control module, module, control, control unit, processor and similar terms refer to various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, or may be executed in response to occurrence of a triggering event. Communication between controllers, and communication between controllers, actuators and/or sensors may be accomplished using a direct wired link, a networked communications bus link, a wireless link, a serial peripheral interface bus or another suitable communications link. Communication includes exchanging data signals in suitable form, including, for example, electrical signals via a conductive medium, electromagnetic signals via air, optical signals via optical waveguides, and the like. Data signals may include signals representing inputs from sensors, signals representing actuator commands, and communications signals between controllers.

The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, an array of parameters, a plurality of executable equations, or another suitable form. A parameter is defined as a measurable quantity that represents a physical property of a device or other element that is discernible using one or more sensors and/or a physical model. A parameter can have a discrete value, e.g., either "1" or "0", or can be infinitely variable in value.

The subject vehicle 10 includes a telematics device 60, which includes a wireless telematics communication system capable of extra-vehicle communications, including communicating with a communication network system having wireless and wired communication capabilities. The telematics device 60 is capable of extra-vehicle communications that includes short-range vehicle-to-vehicle (V2V) communication and/or vehicle-to-everything (V2x) communication, which may include communication with an infrastructure monitor, e.g., a traffic camera, communication with a pedestrian, etc. Alternatively or in addition, the telematics device 60 has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics device 60, and the handheld device executes the extra-vehicle communication, including communicating with an off-board controller 95 via a communication network 90 including a satellite 80, an antenna 85, and/or another communication mode. Alternatively or in addition, the telematics device 60 executes the extra-vehicle communication directly by communicating with the off-board controller 95 via the communication network 90.

The vehicle spatial monitoring system 65 includes a spatial monitoring controller in communication with a plurality of sensing devices. The vehicle spatial monitoring system 65 dynamically monitors an area proximate to the subject vehicle 10 and generates digital representations of observed or otherwise discerned remote objects. The spatial monitoring system 65 can determine a linear range, relative speed, and trajectory of each proximate remote object. The sensing devices of the spatial monitoring system 65 may include, by way of non-limiting descriptions, front corner sensors, rear corner sensors, rear side sensors, side sensors, a front radar sensor, and a camera in one embodiment, although the disclosure is not so limited. Placement of the aforementioned sensors permits the spatial monitoring system 65 to monitor traffic flow including proximate vehicles and other objects around the subject vehicle 10. Data generated by the spatial monitoring system 65 may be employed by a lane mark detection processor (not shown) to estimate the travel path. The sensing devices of the vehicle spatial monitoring system 65 can further include object-locating sensing devices including range sensors, such as FM-CW (Frequency Modulated Continuous Wave) radars, pulse and FSK (Frequency Shift Keying) radars, and LIDAR (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other camera/video image processors which utilize digital photographic methods to 'view' forward and/or rear objects including one or more object vehicle(s). Such sensing systems are employed for detecting and locating objects in automotive applications and are useable with autonomous operating systems including, e.g., adaptive cruise control, autonomous braking, autonomous steering and side-object detection.

The sensing devices associated with the spatial monitoring system 65 are preferably positioned within the subject vehicle 10 in relatively unobstructed positions. Each of these sensors provides an estimate of actual location or condition of an object, wherein said estimate includes an estimated position and standard deviation. As such, sensory detection and measurement of object locations and conditions are typically referred to as 'estimates.' The characteristics of these sensors may be complementary in that some may be more reliable in estimating certain parameters than others. The sensing devices may have different operating ranges and angular coverages capable of estimating different parameters within their operating ranges. For example, radar sensors may estimate range, range rate and azimuth location of an object, but are not normally robust in estimating the extent of a detected object. A camera with vision processor is more robust in estimating a shape and azimuth position of the object, but may be less efficient at estimating the range and range rate of an object. Scanning type LIDAR sensors perform efficiently and accurately with respect to estimating range, and azimuth position, but typically cannot estimate range rate, and therefore may not be as accurate with respect to new object acquisition/recognition. Ultrasonic sensors are capable of estimating range but may be less capable of estimating or computing range rate and azimuth position. The performance of each of the aforementioned sensor technologies is affected by differing environmental conditions. Thus, some of the sensing devices may present parametric variances during operation, although overlapping coverage areas of the sensors create opportunities for sensor data fusion. Sensor data fusion includes combining sensory data or data derived from sensory data from various sources that are observing a common field of view such that the resulting information is more accurate and precise than would be possible when these sources are used individually.

The HMI system 75 provides for human/machine interaction, for purposes of directing operation of an infotainment system, the GPS sensor 50, the vehicle navigation system 55, a remotely located service center and the like.

The HMI system 75 monitors operator requests and provides information to the operator including status of vehicle systems, service and maintenance information. The HMI system 75 communicates with and/or controls operation of a plurality of in-vehicle operator interface device(s). The HMI system 75 may also communicate with one or more devices that monitor biometric data associated with the vehicle operator, including, e.g., eye gaze location, posture, and head position tracking, among others. The HMI system 75 is depicted as a unitary device for ease of description, but may be configured as a plurality of controllers and associated sensing devices in an embodiment of the system described herein. The in-vehicle operator interface device(s) can include devices that are capable of transmitting a message urging operator action, and can include an electronic visual display module, e.g., a liquid crystal display (LCD) device, a heads-up display (HUD), an audio feedback device, a wearable device and a haptic seat.

The subject vehicle 10 can include an autonomous operating system 45 that is disposed to provide a level of autonomous vehicle operation. The autonomous operating system 45 includes a controller and one or a plurality of subsystems that may include an autonomous steering system, the ACC 40, an autonomous braking/collision avoidance system and/or other systems that are configured to command and control autonomous vehicle operation separate from or in conjunction with operator requests. Autonomous operating commands may be generated to control the autonomous steering system, the ACC 40, the autonomous braking/collision avoidance system and/or the other systems. Vehicle operation includes operation in one of the propulsion modes in response to desired commands, which can include operator requests and/or autonomous vehicle requests. Vehicle operation, including autonomous vehicle operation includes acceleration, braking, steering, steady-state running, coasting, and idling. Operator requests can be generated based upon operator inputs to an accelerator pedal, a brake pedal, a steering wheel, a transmission range selector, the ACC 40, and the HMI system 75. Vehicle acceleration includes a tip-in event, which is a request to increase vehicle speed, i.e., accelerate the subject vehicle 10. A tip-in event can originate as an operator request for acceleration or as an autonomous vehicle request for acceleration. One non-limiting example of an autonomous vehicle request for acceleration can occur when a sensor for the ACC 40 indicates that a vehicle can achieve a desired vehicle speed because an obstruction has been removed from a lane of travel, such as may occur when a slow-moving vehicle exits from a limited access highway. Braking includes an operator request to decrease vehicle speed. Steady-state running includes vehicle operation wherein the subject vehicle 10 is presently moving at a rate of speed with no operator request for either braking or accelerating, with the vehicle speed determined based upon the present vehicle speed and vehicle momentum, vehicle wind resistance and rolling resistance, and driveline inertial drag, or drag torque. Coasting includes vehicle operation wherein vehicle speed is above a minimum threshold speed and the operator request to the accelerator pedal is at a point that is less than required to maintain the present vehicle speed. Idle includes vehicle operation wherein vehicle speed is at or near zero. The autonomous operating system 45 includes an instruction set that is executable to determine a trajectory for the subject vehicle 10, and determine present and/or impending travel path conditions and traffic conditions based upon the trajectory for the subject vehicle 10.

Figure 2:
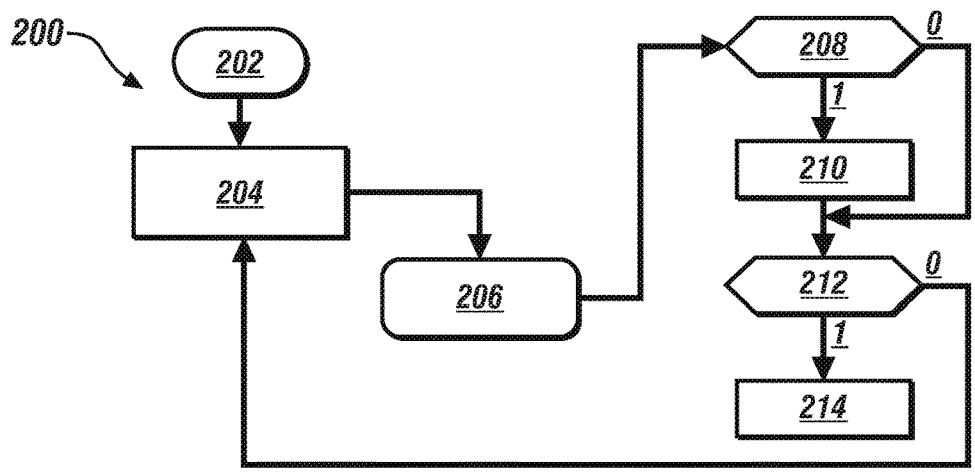
FIG. 2 schematically shows a novel ACC control routine that may operate on an embodiment of the vehicle including the ACC system that is described with reference to FIG. 1, in accordance with the disclosure.

FIG. 2 schematically shows details related to a novel ACC control routine 200 that is arranged to operate an embodiment of vehicle 10 including the ACC 40 that is described with reference to FIG. 1. A feature of the ACC control routine 200 includes employing a desired following gap range when the subject vehicle 10 is following a lead vehicle, wherein the desired following gap range may be dynamically adjustable, and is calibrated to avoid unnecessary acceleration and deceleration and also prevent cut in by other vehicles per traffic flow. Another feature of the ACC control routine 200 includes employing a predictive approach of adapting vehicle speed to handle changes to the road grade, thus improving energy efficiency and minimizing transmission gear shifting and/or engine mode switching.

The ACC control routine 200 initiates operation in response to an operator request for cruise control (202), which includes setting, via the HMI system 75, initial control parameters for operating the ACC 40 (204). The initial control parameters for operating the ACC 40 may include a desired vehicle cruise speed and a desired following gap, which are employed in controlling vehicle operation. The desired vehicle speed may be a nominal speed with an associated maximum cruise speed and an associated minimum cruise speed, which introduces hysteresis into the speed control routine. The following gap is a selectable preset distance between the subject vehicle 10 and a lead vehicle, when a lead vehicle is present. In one embodiment, the following gap is one of a plurality of selectable following gaps that may be labelled as Far, Medium or Near following gaps. The magnitudes of the following gaps are proportional to vehicle speed. The following gap is defined as a desired following gap range in one embodiment, wherein the desired following gap range has hysteresis in the form of a desired minimum following gap and a desired maximum following gap, both of which are distance values. The desired minimum following gap may be selected based upon vehicle stopping distance and related factors in order to maintain a minimum safe following distance. The desired maximum following gap may be selected based upon traffic density and related factors to maintain vehicle progress in traffic flow. Values for the desired minimum following gap and the desired maximum following gap may be vehicle-specific and determined in relation to vehicle speed, vehicle load, road surface conditions, weather conditions, etc. Values for the desired minimum following gap and the desired maximum following gap may be predetermined and stored as a calibrated array in a memory device of the controller 15 for access during vehicle operation. Values for the desired minimum following gap and the desired maximum following gap may be dynamically adjusted based upon changes in the vehicle speed, vehicle load, road surface conditions, weather conditions, etc.

During operation, the ACC 40 assesses traffic conditions, assesses road and weather conditions and monitors for presence of a lead vehicle (206), employing information gathered from on-vehicle and off-board devices. This may include employing V2V communication and/or V2x communication via the telematics device 60 to collect real-time traffic flow information and available infrastructure information, such as road grade, curvature, intersection, speed limit, traffic signs, traffic light, etc. This also may include detecting and tracking moving and/or stationary objects in the surrounding traffic via the vehicle spatial monitoring system 65.

Upon detecting presence of a lead vehicle (208)(1), the ACC control routine 200 gathers information, including determining a speed of the lead vehicle and other parameters in order to update and possibly adjust the initial control parameters associated with the ACC 40. The initial control parameters associated with the ACC 40 for the subject vehicle 10 may be adjusted based upon parameters related to the speed of the lead vehicle, the traffic conditions, and the road conditions, and the ACC 40 is controlled to operate the subject vehicle 10 based upon the adjusted control parameters (210). This includes selecting the desired following gap range, including selecting the desired minimum following gap and the desired maximum following gap, wherein the desired minimum following gap and the desired maximum following gap are selected based upon operating conditions, traffic conditions, etc., as described herein. Thus, the subject vehicle 10 can operate with the following gap being flexible within the desired following gap range.

This may also include employing a machine learning-based driver model by monitoring speed of the lead vehicle over a period of time in order to predict behavior of the operator of the lead vehicle and thus provide a predictive speed of the lead vehicle within a time horizon. Aspects of a machine learning-based driver model may include, by way of example, expected acceleration and deceleration rates, an expected vehicle following gap, an expected reaction time and distance to traffic control devices, and expected cruising speed control tendencies. Machine learning-based driver models are known, and thus not described in detail. The machine learning-based driver model of the lead vehicle can be dynamically executed while being followed by the subject vehicle 10 to predict future movement and operation of the lead vehicle, including predicting a lead vehicle speed and a lead vehicle geographic position. The desired vehicle speed for the subject vehicle 10 can be updated and adjusted based upon the speed of the lead vehicle and the predicted operation of the lead vehicle, the traffic conditions, and the road conditions.

The step of controlling, via the ACC 40, operation of the subject vehicle 10 based upon the desired following gap range includes converting the predicted operation of the lead vehicle into a time-distance domain and executing a control theory that includes adjusting the desired vehicle speed for the subject vehicle 10 based upon the speed of the lead vehicle and the predicted operation of the lead vehicle in the time-distance domain so as not to fall outside the desired following gap range. The control theory includes adjusting the desired vehicle speed for the subject vehicle 10 based upon the speed of the lead vehicle and the predicted operation of the lead vehicle in the time-distance domain by adjusting the desired vehicle speed for the subject vehicle 10 so as not to fall outside the desired following gap range while minimizing time-rate changes in vehicle acceleration and vehicle deceleration. This dynamic adjustment of the speed of the subject vehicle 10 advantageously generates a speed trace within a prediction horizon that minimizes acceleration-to-deceleration inflection points and deceleration-to-acceleration inflection points.

Figure 3:
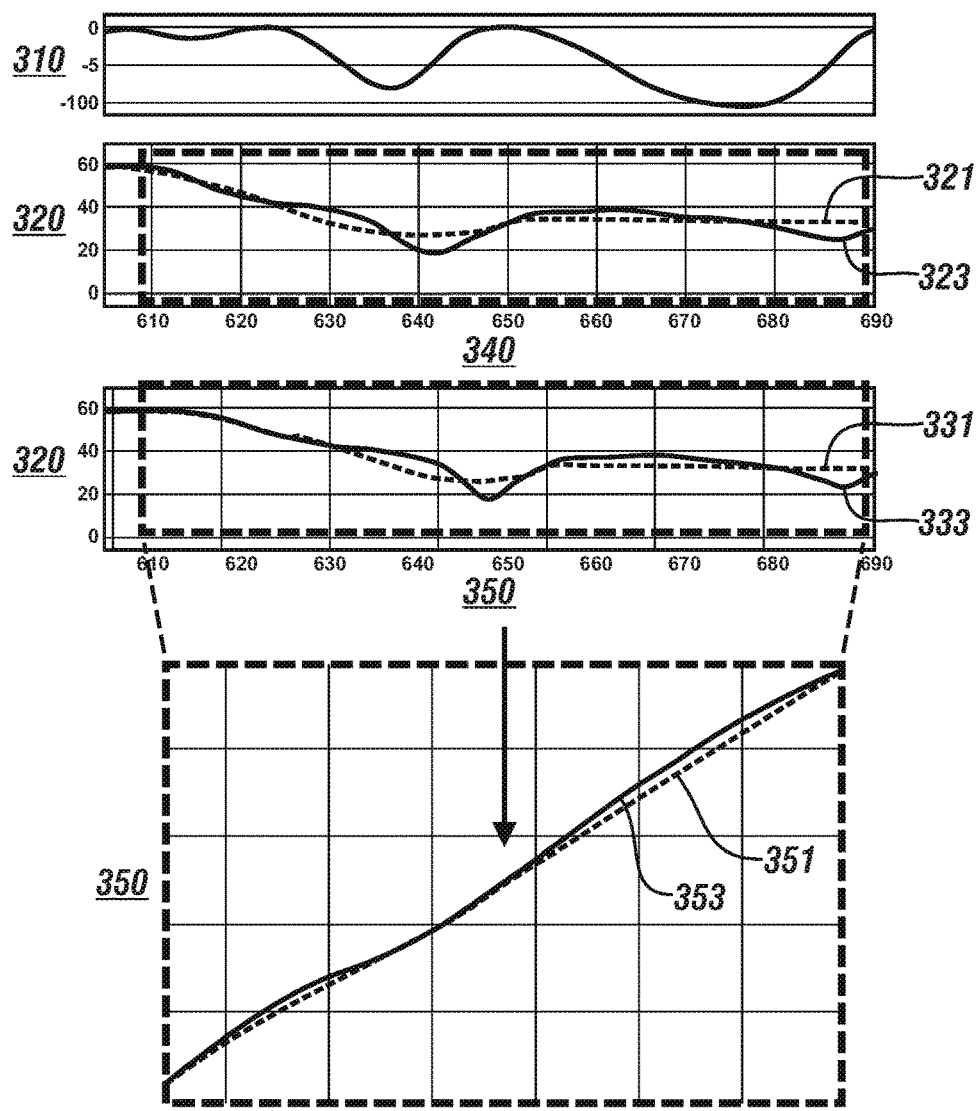
FIG. 3 graphically shows vehicle operating parameters, including a following gap, speed, distance traveled, and elapsed time associated with operation of an embodiment of the vehicle including the ACC system and ACC control routine, in accordance with the disclosure.

FIG. 3 graphically shows the effect of such operation, including showing vehicle operating parameters associated with operation of an embodiment of the vehicle 10 described with reference to FIG. 1 employing the ACC system 20 that is executing an embodiment of the ACC control routine 200 that is described with reference to FIG. 2. Plotted operating parameters include a following gap 310, and operations of the subject vehicle and the lead vehicle. Operating parameters include vehicle speeds 321, 323, respectively, of the respective subject vehicle and the lead vehicle, plotted with vehicle speed 320 indicated on the vertical axis, in relation to elapsed time 340 on the horizontal axis. Operating parameters further include vehicle speeds 331, 333, respectively, of the respective subject vehicle and the lead vehicle, plotted in relation to travel distance 350. The operating parameters are processed to shown travel distances 351, 353, respectively, for the respective subject vehicle and lead vehicle, in relation to elapsed time 340. The results indicate that operating with a flexible gap, i.e., with a desired following gap range, will result in a variation in vehicle speed over time and travel distance, but with an overall distance traveled being unchanged between the lead vehicle and the subject vehicle, with an attendant smoothing out of the speed of the subject vehicle. Thus, using the lead vehicle's travel as reference, the ACC control routine 200 is able to dynamically adjust the following gap to generate a smooth speed trace within a prediction horizon associated with the machine learning-based driver model to provide a predictive vehicle speed of the lead vehicle within a time horizon.

When the subject vehicle 10 is approaching an uphill grade or a downhill grade (212)(1), the ACC control routine 200 may operate to adjust the initial control parameters associated with the ACC 40 based upon parameters related to the impending uphill or downhill grade that is in the travel path of the subject vehicle 10, and the ACC 40 is controlled to operate the subject vehicle 10 based upon the adjusted control parameters (214). This includes detecting an approaching grade in the travel path, and adjusting the control parameters to control the desired vehicle speed based upon the approaching grade. This may further include adjusting the vehicle control parameters to control the desired vehicle speed and the desired following gap for the subject vehicle 10 based upon the approaching grade. When no impending uphill or downhill grade is anticipated (212)(0), operation reverts to again determining the initial control parameters for operating the ACC 40 (204).

Figure 4:
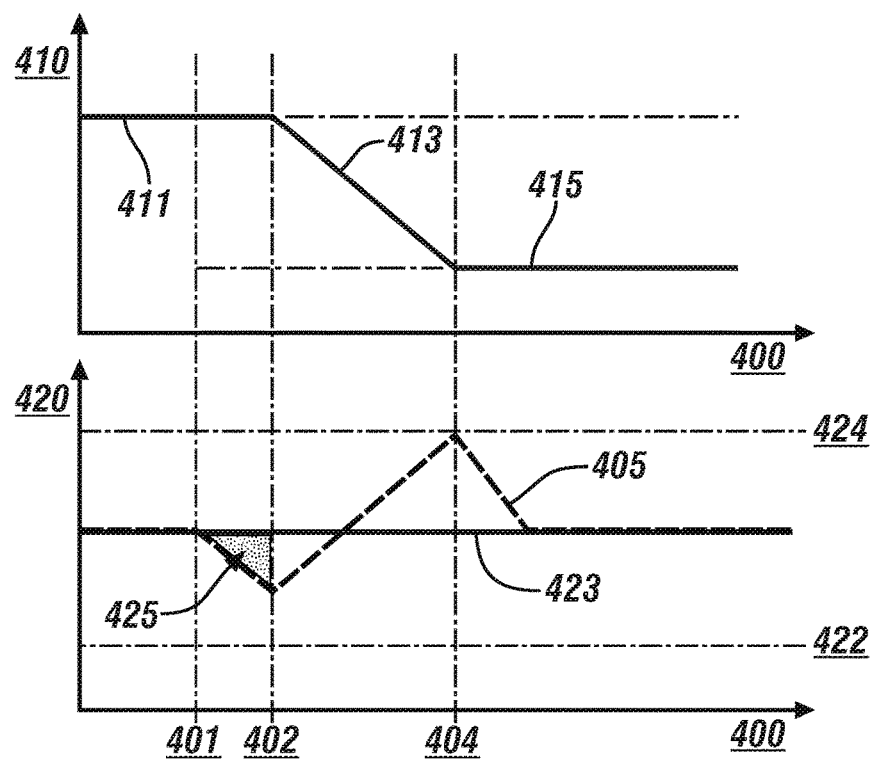
FIG. 4 graphically shows results associated with operation of a subject vehicle employing the ACC control routine under a condition when the subject vehicle 10 is approaching a downhill grade, in accordance with the disclosure.

FIG. 4 graphically shows results associated with operation of the subject vehicle 10 of FIG. 1, employing the ACC control routine 200 of FIG. 2 when the subject vehicle 10 is approaching a downhill grade. The plotted parameters include road grade 410, and speeds 420 including a nominal cruise speed 423 and a desired cruise speed 405, in relation to travel distance 400, which is indicated on the horizontal axis. The road grade includes a first period of level operation 411, a second period on a downhill grade 413, and a final period of level operation 415. The start of the downhill grade 413 is indicated at timepoint 402 and the end of the downhill grade 413 is indicated at timepoint 404. Also indicated are control parameters for the ACC system, 40, including the nominal cruise speed 423, a desired maximum cruise speed 424 and a desired minimum cruise speed 422.

In operation, when the trajectory of the subject vehicle 10 indicates that it is approaching the downhill grade, the control parameters are adjusted by initially reducing the desired cruise speed 405 at a start timepoint 401, which is prior to the start of the downhill grade 413 indicated by timepoint 402. The start timepoint 401 is selected to permit a decrease in the actual vehicle speed, while avoiding reaching a vehicle speed that is less than the desired minimum vehicle speed 422. Adjusting the control parameters to control operation of the propulsion system 20 and/or the wheel braking system 30 in response to the desired cruise speed 405 based upon the approaching downhill grade may include decreasing engine speed, unlocking a torque converter, upshifting a transmission gear, operating the AFM system of the engine to reduce the quantity of active engine cylinders, etc. As the subject vehicle 10 crests and begins traversing the downhill grade 413, the actual vehicle speed is expected to increase due to effects of gravity. The desired cruise speed 405 may be permitted to increase until it achieves the desired maximum cruise speed 424, at which point engine control parameters and wheel braking parameters may be adjusted to avoid exceeding the maximum cruise speed 424. Furthermore, regenerative energy recovery strategies may be invoked while the subject vehicle 10 is traversing the downhill grade, thus avoiding achieving the desired maximum cruise speed 424. Area 425 indicates that portion of a trip that is associated with reducing energy consumption as a result of the operation of the subject vehicle 10 when approaching a downhill grade.

Figures 1, 5:
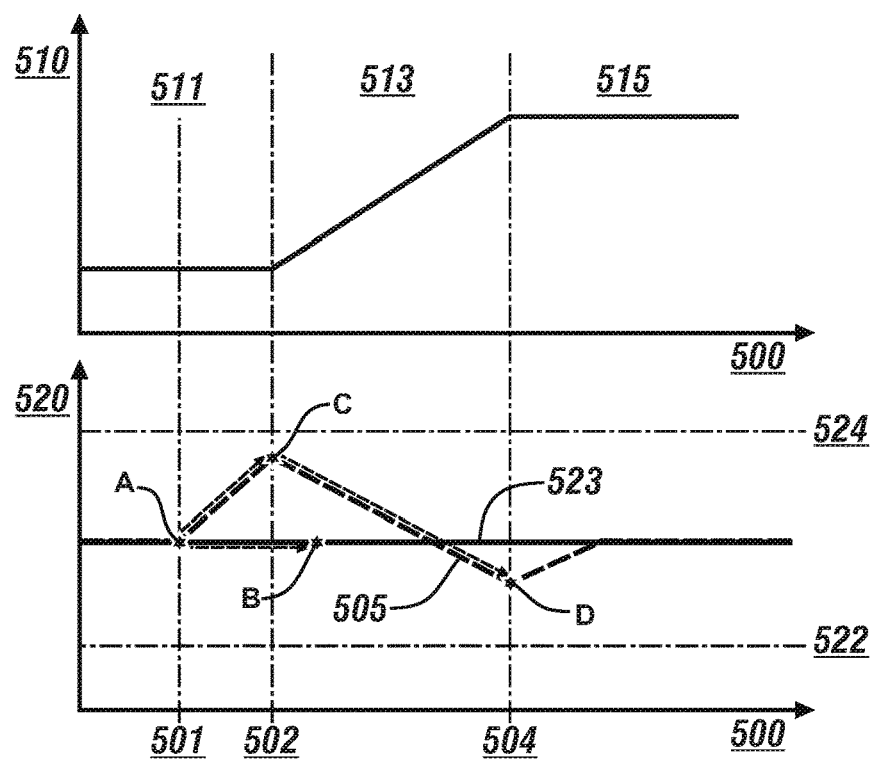
Figures 2, 5:
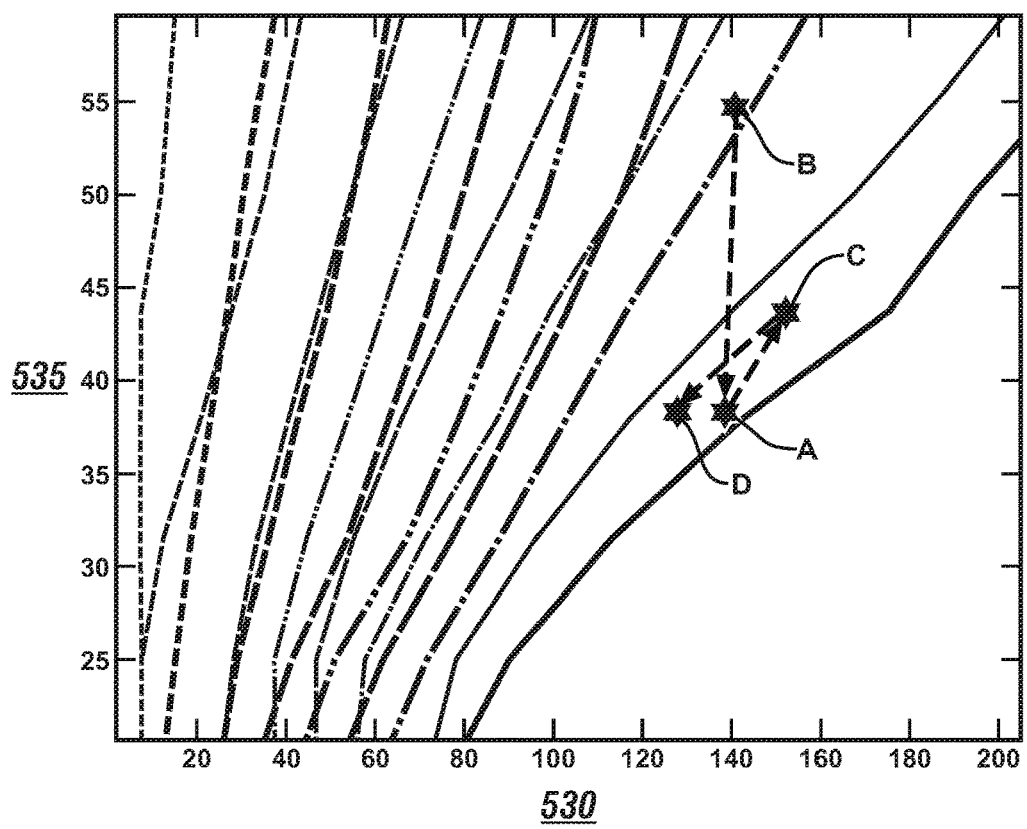
Figures 3, 5:
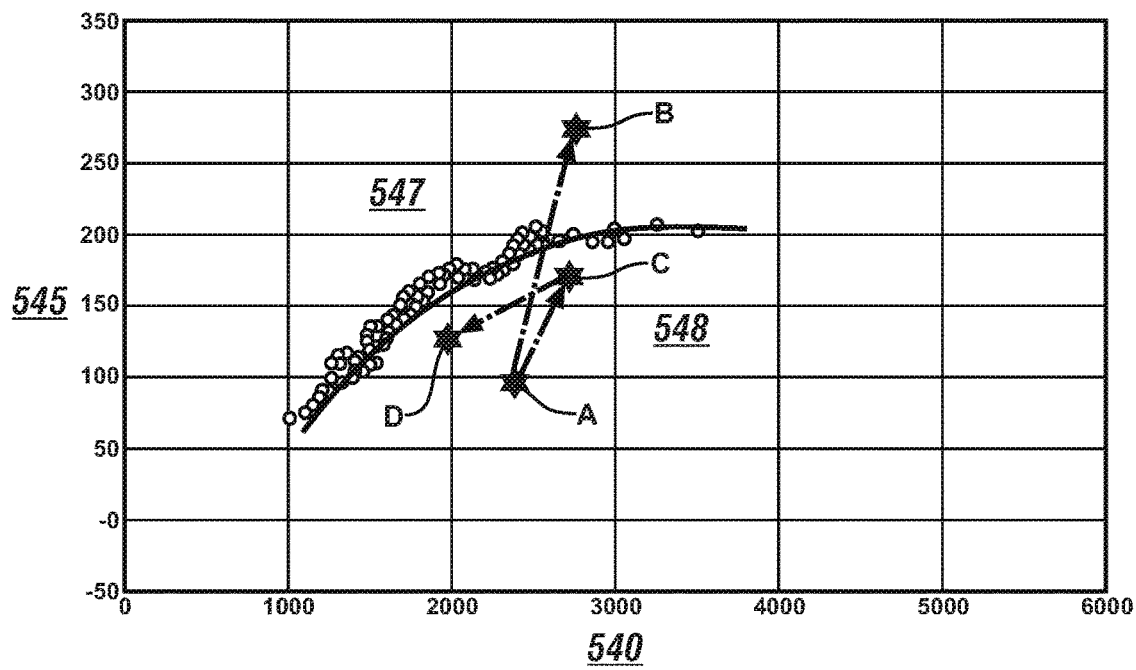

FIGS. 5-1, 5-2 and 5-3 graphically shows results associated with operation of the subject vehicle 10 of FIG. 1, employing the ACC control routine 200 of FIG. 2 when the subject vehicle 10 is approaching an uphill grade. The plotted parameters of FIG. 5-1 include road grade 510, and speeds 520 including a nominal cruise speed 523, and a desired cruise speed 505, plotted in relation to travel distance 500, which is indicated on the horizontal axis. The plotted parameters of FIG. 5-2 include a transmission shift map for an embodiment of the geartrain 23 of the subject vehicle 10, which may be an eight-speed step gear transmission, wherein a plurality of upshift points and downshift points are indicated in relation to vehicle speed 530 and load 535. The plotted parameters of FIG. 5-3 show an AFM calibration line 546, which delineates operation of the engine 21 of the subject vehicle 10 in an all-cylinder state 547 and an AFM state 548, which is shown with reference to engine speed 540 and engine torque 545.

Referring again to FIG. 5-1, the road grade includes a first period of level operation 511, a second period on an uphill grade 513, and a final period of level operation 515. The start of the uphill grade 513 is indicated at timepoint 502 and the end of the uphill grade 513 is indicated at timepoint 504. Also indicated are control parameters for the ACC system, 40, including the nominal cruise speed 523, a desired maximum cruise speed 524 and a desired minimum cruise speed 522. Points A, B, C, and D are operating points that are depicted in each of FIGS. 5-1, 5-2, and 5-3.

Referring again to FIG. 5-1, points A and B indicate operation of the subject vehicle 10 under a condition when the ACC control routine 200 of FIG. 2 is not activated and the subject vehicle 10 is approaching an uphill grade. In this case, the commanded cruise control speed is set at the nominal cruise speed 523 throughout the operation. The operation will result in an initial downshift operation in the geartrain 23, as indicated in FIG. 5-2, and an immediate transition from operating the engine 21 in the AFM state 548 to operating in the all-cylinder state 547.

Referring again to FIG. 5-1, points A, C and D indicate operation of the subject vehicle 10 under a condition when the ACC control routine 200 of FIG. 2 has been activated and the subject vehicle 10 is approaching an uphill grade. In this case, the commanded cruise control speed is adjusted to follow the desired cruise speed 505 throughout the operation. The operation will result in an initial increase in the desired cruise speed 505, beginning at timepoint 501, although the increase in the desired cruise speed 505 will be less than the desired maximum cruise speed 524. The timepoint 501 is selected to permit an increase in the nominal cruise speed 523, while avoiding reaching a vehicle speed that is greater than the desired maximum vehicle speed 524, and avoiding reducing the following gap to be less than the desired minimum following gap when following a lead vehicle. When the subject vehicle 10 begins to traverse the uphill grade, starting at timepoint 502 and indicated by Point C, the desired cruise speed 505 begins to decrease, and may decrease until the subject vehicle 10 crests the hill at timepoint 504 and indicated by point D. After cresting the hill, the desired cruise speed 505 begins to resume operation at the nominal cruise speed 523.

As shown with reference to FIG. 5-2, this operation may be executed such that the geartrain 23 may operate in the same fixed gear throughout the operation. Furthermore, FIG. 5-3 indicates that this operation may be executed such that the engine 21 may operate in the AFM state throughout the operation. As such the uphill operation includes accelerating while approaching the uphill condition to avoid a sudden torque request increase, thus minimizing or avoiding downshifting or shift busyness, and also minimizing or avoiding frequent engine mode change, and maintaining engine operation in an energy efficient operating mode. The maximum engine speed, indicated by point C, and the minimum engine speed, indicated by point D, may be selected by taking into account the transmission shift map shown with reference to FIG. 5-2 and the AFM calibration line 546 shown with reference to FIG. 5-3.

The subject vehicle 10 is capable of dynamically adjusting the following gap in relation to a lead vehicle, and can also adjust the cruise speed to handle large road gradients and to gain energy efficiency based on preview information as determined by the on-vehicle monitoring systems and off-vehicle communications. The following gap may be calibrated to prevent cut in by other vehicles per traffic flow, and may be adjusted to avoid unnecessary acceleration and deceleration. This includes employing a predictive approach of adapting vehicle speed to handle road grade and prevent frequent shifting or engine mode switching. The concepts described herein may apply to various vehicle and powertrain configurations, and is not limited to those described. It applies to vehicles regardless of the powertrain and driveline type.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, the present disclosure may take the form of a computer program product embodied in a tangible medium of expression having computer-usable program code embodied in the medium.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for operating a subject vehicle equipped with an adaptive cruise control system, the method comprising:
setting initial states for control parameters associated with the adaptive cruise control system, including setting a desired vehicle speed;
determining a desired following gap range, wherein the desired following gap range is relative to a lead vehicle, wherein determining the desired following gap range includes determining a minimum permissible following gap and a maximum permissible following gap relative to the lead vehicle;
controlling, via the adaptive cruise control system, operation of the subject vehicle based upon the initial states for the control parameters;
monitoring for presence of the lead vehicle; and
upon detecting presence of the lead vehicle:
dynamically determining an actual following gap between the subject vehicle and the lead vehicle;
adjusting the initial states of the control parameters associated with the adaptive cruise control system based upon the actual following gap between the subject vehicle and the lead vehicle and the desired following gap range; and
controlling, via the adaptive cruise control system, operation of the subject vehicle based upon the adjusted initial states of the control parameters.

2. The method of claim 1, wherein the subject vehicle includes a propulsion system and a braking system that are operably connected to the adaptive cruise control system, and wherein controlling, via the adaptive cruise control system, operation of the subject vehicle based upon the adjusted initial states of the control parameters comprises controlling, via the adaptive cruise control system, operation of the propulsion system and the braking system based upon the adjusted initial states of the control parameters.

3. The method of claim 1,
wherein controlling, via the adaptive cruise control system, operation of the subject vehicle based upon the adjusted initial states of the control parameters comprises controlling, via the adaptive cruise control system, operation of the subject vehicle such that the actual following gap between the subject vehicle and the lead vehicle is greater than the minimum permissible following gap and is less than the maximum permissible following gap.

4. The method of claim 1, wherein the subject vehicle includes a spatial monitoring system, and wherein monitoring for the presence of the lead vehicle comprises monitoring, via the spatial monitoring system, for the presence of the lead vehicle.

5. The method of claim 4, further comprising determining, via the spatial monitoring system, the actual following gap between the subject vehicle and the lead vehicle.

6. The method of claim 5, wherein the vehicle further includes a telematics device arranged to effect extra-vehicle communication with a second controller, the method further comprising:
assessing, via the extra-vehicle communication with the second controller and the spatial monitoring system, traffic conditions proximal to the subject vehicle;
determining, via the vehicle spatial monitoring system, a speed of the lead vehicle; and
determining the desired following gap range based upon the speed of the lead vehicle and the traffic proximal to the subject vehicle.

7. The method of claim 6, wherein the subject vehicle includes a GPS sensor and a vehicle navigation system, the method further comprising:
assessing, via the GPS sensor and the vehicle navigation system, impending road conditions; and
controlling, via the adaptive cruise control system, operation of the subject vehicle based upon the adjusted initial states of the control parameters and the impending road conditions.

8. The method of claim 1, further comprising:
monitoring speed of the lead vehicle over a period of time;
developing a driver model of the lead vehicle based upon the speed of the lead vehicle over the period of time;
predicting operation of the lead vehicle based upon the driver model of the lead vehicle; and
adjusting the initial states of the control parameters associated with the adaptive cruise control system based upon the actual following gap between the subject vehicle and the lead vehicle, the desired following gap range and the predicted operation of the lead vehicle based upon the driver model of the lead vehicle; and
controlling, via the adaptive cruise control system, operation of the subject vehicle based upon the adjusted initial states of the control parameters.

9. The method of claim 8, further comprising:
converting the predicted operation of the lead vehicle into a time-distance domain; and
adjusting the desired vehicle speed for the subject vehicle based upon the speed of the lead vehicle and the predicted operation of the lead vehicle in the time-distance domain.

10. The method of claim 9, wherein the desired following gap range comprises a desired minimum following distance relative to the lead vehicle and a desired maximum following distance relative to the lead vehicle; and
wherein adjusting the desired vehicle speed for the subject vehicle based upon the speed of the lead vehicle and the predicted operation of the lead vehicle in the time-distance domain comprises adjusting the desired vehicle speed for the subject vehicle such that the subject vehicle remains within the following gap range relative to the lead vehicle.

11. A method for operating a subject vehicle equipped with an adaptive cruise control system, a GPS sensor and a vehicle navigation system, the method comprising:
setting initial states for control parameters associated with the adaptive cruise control system, including setting a desired vehicle speed;
determining a desired following gap range, wherein the desired following gap range is relative to a lead vehicle, wherein determining the desired following gap range includes determining a minimum permissible following gap and a maximum permissible following gap relative to the lead vehicle;

controlling, via the adaptive cruise control system, operation of the subject vehicle based upon the initial states for the control parameters and the desired following gap range;

assessing, via the GPS sensor and the vehicle navigation system, impending road conditions;

adjusting the initial states of the control parameters associated with the adaptive cruise control system based upon the impending road conditions; and controlling, via the adaptive cruise control system, operation of the subject vehicle based upon the adjusted initial states of the control parameters.

12. The method of claim 11, wherein the subject vehicle includes a propulsion system and a braking system that are operably connected to the adaptive cruise control system, and wherein controlling, via the adaptive cruise control system, operation of the subject vehicle based upon the adjusted initial states of the control parameters comprises controlling, via the adaptive cruise control system, operations of the propulsion system and the braking system based upon the adjusted initial states of the control parameters.

13. The method of claim 12, wherein assessing the impending road conditions comprises detecting, via the GPS sensor and the vehicle navigation system, an approaching grade in the road, the method further comprising:

adjusting the initial states of the control parameters associated with the adaptive cruise control system based upon the approaching grade in the road.

14. The method of claim 13, wherein detecting the approaching grade in the road comprises detecting an approaching uphill grade associated with a hill, and wherein adjusting the initial states of the control parameters associated with the adaptive cruise control system based upon the approaching grade in the road comprises:

initially increasing a desired cruise speed, wherein the increase in the desired cruise speed is less than a desired maximum cruise speed prior to beginning to traverse the uphill grade;

decreasing the desired cruise speed during the uphill grade, and resuming operation at a nominal cruise speed upon cresting the hill.

15. The method of claim 13, wherein detecting the approaching grade in the road comprises detecting an approaching downhill grade; and wherein adjusting the initial states of the control parameters associated with the adaptive cruise control system based upon the approaching grade in the road comprises:

initially adjusting a state of one of the control parameters associated with the adaptive cruise control system prior to a start of the downhill grade while avoiding reaching a vehicle speed that is less than a desired minimum cruise speed, monitoring vehicle speed, and adjusting a state of one of the control parameters associated with the adaptive cruise control system to avoid exceeding a maximum cruise speed during operation in the downhill grade.

16. The method of claim 15, wherein the control parameters associated with the adaptive cruise control system include control parameters associated with operations of the propulsion system and the braking system, and wherein initially adjusting the state of one of the control parameters associated with the adaptive cruise control system prior to the start of the downhill grade includes one of decreasing a speed of an internal combustion engine associated with the propulsion system, unlocking a torque converter clutch of a torque converter associated with the propulsion system, and upshifting a transmission gear of a transmission of the propulsion system while avoiding the vehicle speed that is less than the desired minimum cruise speed.

17. The method of claim 15, wherein the control parameters associated with the adaptive cruise control system include control parameters associated with operations of the propulsion system and the braking system, and wherein initially adjusting the state of one of the control parameters associated with the adaptive cruise control system to avoid exceeding a maximum cruise speed during operation in the downhill grade include controlling the braking system to avoid exceeding the maximum cruise speed during operation in the downhill grade.

18. A subject vehicle, comprising:

an adaptive cruise control system operatively connected to a propulsion system and a wheel braking system, and in communication with a spatial monitoring system, a controller, in communication with the propulsion system, the wheel braking system, the adaptive cruise control system, and the spatial monitoring system, the controller including a memory device containing an instruction set, the instruction set executable to:

set initial states for control parameters associated with the adaptive cruise control system, including a desired vehicle speed;

determine a desired following gap range, wherein the desired following gap range is relative to a lead vehicle, wherein determining the desired following gap range includes determining a minimum permissible following gap and a maximum permissible following gap relative to the lead vehicle;

operate the adaptive cruise control system to control the propulsion system and the wheel braking system based upon the initial control parameters;

assess, via the spatial monitoring system, traffic conditions;

assess road conditions;

monitor for presence of the lead vehicle; and upon detecting presence of the lead vehicle:

determine a speed of the lead vehicle, adjust the states of the initial control parameters associated with the adaptive cruise control system for the subject vehicle based upon the speed of the lead vehicle, the traffic conditions, and the road conditions, and control, via the adaptive cruise control system, operation of the propulsion system and the wheel braking system based upon the adjusted states of the control parameters.

19. The subject vehicle of claim 18, wherein the instruction set executable to control, via the adaptive cruise control system, operation of the propulsion system and the wheel braking system based upon the adjusted states of the control parameters comprises the instruction set executable to control operation of the propulsion system and the wheel braking system such that the actual following gap between the subject vehicle and the lead vehicle is greater than the minimum permissible following gap and is less than the maximum permissible following gap.

* * * * *